Figure 1:
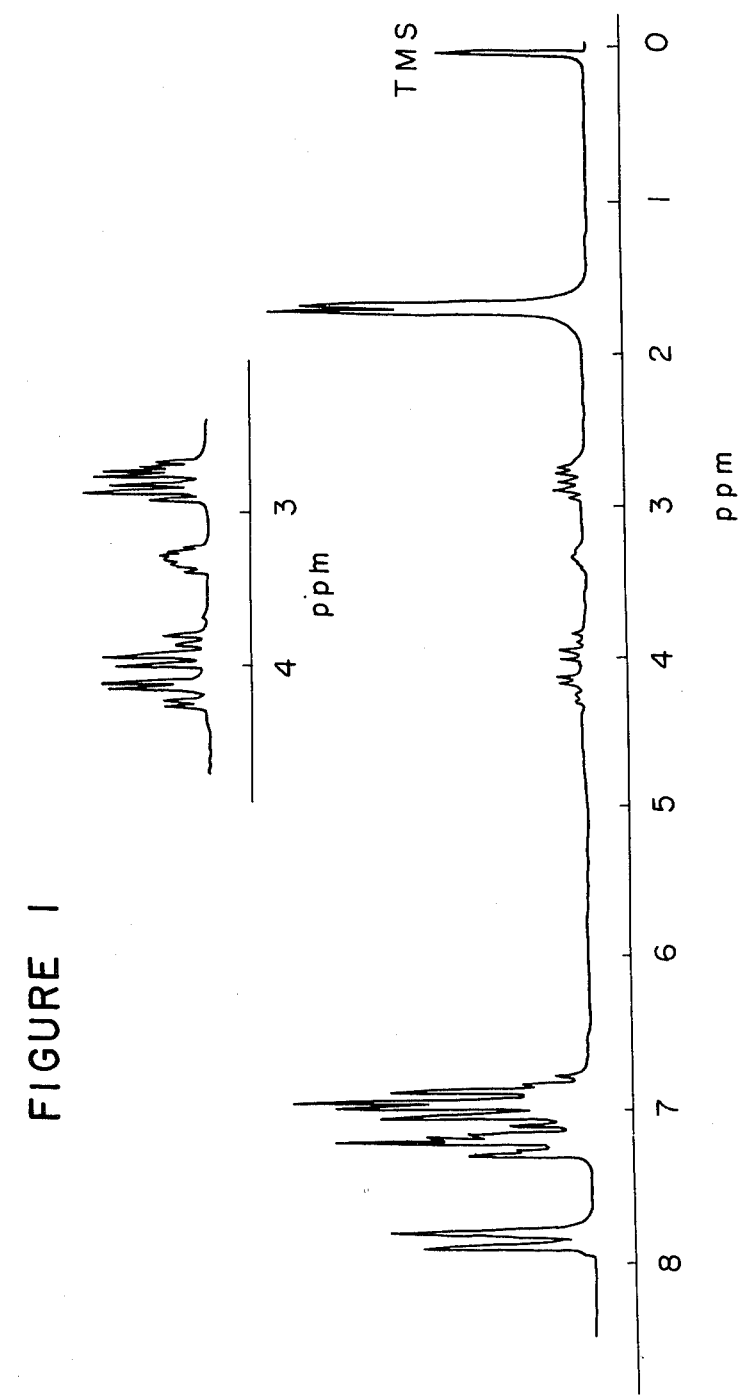

United States Patent [19]

Tsubaki et al.

[11] 4,448,948
[45] May 15, 1984

[54] EPOXY RESIN AND THE PROCESS FOR ITS PRODUCTION

[75] Inventors: Kazumi Tsubaki; Hiroshi Morinaga; Joei Yukawa, all of Ichihara, Japan

[73] Assignee: Nissan Chemical Industries, Ltd., Tokyo, Japan

[21] Appl. No.: 458,039

[22] Filed: Jan. 14, 1983

[30] Foreign Application Priority Data

Feb. 3, 1982 [JP] Japan .................... 57-14827

[51] Int. Cl.³ .............. C08G 59/02; C08G 59/24; C08G 59/30
[52] U.S. Cl. .................... 528/95; 525/471; 525/534; 528/98; 528/99; 528/106; 528/109; 549/517; 549/556
[58] Field of Search ............ 528/95, 98, 99, 106, 528/109; 549/517, 556; 525/471, 534

[56] References Cited

U.S. PATENT DOCUMENTS 3,733,305  5/1973  Loewrigkeit et al. ............. 528/99
4,296,217 10/1981  Stuart-Webb ................. 525/534 X
4,331,798  5/1982  Staniland ..................... 528/125
4,360,630 11/1982  Smith ......................... 528/99 X

*Primary Examiner*—Earl A. Nielsen
*Attorney, Agent, or Firm*—Oblon, Fisher, Spivak, McClelland & Maier

[57] ABSTRACT

An epoxy resin substantially represented by the general formula

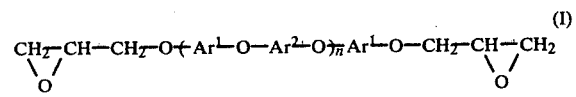

where $Ar^1$ is a residual group of a dihydric phenol derived from a compound having one or two benzene nuclei, $Ar^2$ is residual group of a halogen-substituted benzenoid compound having two halogen atoms on its nuclei and represented by the formula $-Ar^3-Y-Ar^4-$ where each of $Ar^3$ and $Ar^4$ is a hydrocarbon group having a divalent benzene nucleus and Y is a sulfone group or a carbonyl group, and n is an integer of from 1 to 50.

8 Claims, 2 Drawing Figures

EPOXY RESIN AND THE PROCESS FOR ITS PRODUCTION

The present invention relates to a novel epoxy resin having a skeletal or basic structure composed of a polyarylenesulfone and a polyaryleneketone and a process for its production.

The most popular epoxy resin presently available is a condensation product of a bisphenol A with epichlorohydrin. Such an epoxy resin is widely used, as hardened by a hardener such as an amine, an acid anhydride or a trifluoroboron complex compound, for coating materials, laminated products, cast products, molded products or adhesives. The hardened material has excellent adhesion, electrically insulating properties, dielectric characteristics, dimentional stability, mechanical properties or chemical resistance.

However, in recent years, there has been an increasing demand for high quality resin materials. With respect to epoxy resins, it is desired to improve the heat resistance, chemical resistance, impact strength and water absorbability.

Accordingly, it is an object of the present invention to provide an epoxy resin which has the desirable properties of the epoxy resin in general and yet is superior in its heat resistance, chemical resistance, water absorbability, mechanical property and electrical property.

Namely, the present invention provides an epoxy resin substantially represented by the general formula

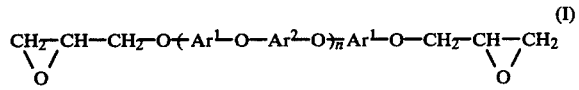
(I)

where $Ar^1$ is a residual group of a dihydric phenol derived from a compound having one or two benzene nuclei, $Ar^2$ is residual group of a halogen-substituted benzenoid compound having two halogen atoms on its nuclei and represented by the formula $-Ar^3-Y-Ar^4-$ where each of $Ar^3$ and $Ar^4$ is a hydrocarbon group having a divalent benzene nucleus and Y is a sulfone group or a carbonyl group, and n is an integer of from 1 to 50.

The present invention also provides a process for producing an epoxy resin which comprises reacting epichlorohydrin with a reaction product A obtained by reacting a compound represented by the general formula II

where $Ar^1$ is a residual group of a dihydric phenol derived from a compound having one or two benzene nuclei and M is an alkali metal, with a compound represented by the general formula III

where $Ar^2$ is a residual group of a halogen-substituted benzenoid compound having two halogen atoms on its nuclei and represented by the formula $-Ar^3-Y-Ar^4-$ where each of $Ar^3$ and $Ar^4$ is a hydrocarbon group having a divalent benzene nucleus and Y is a sulfone group or a carbonyl group, and X is a fluorine atom, a chlorine atom or a bromine atom, in a solvent containing a highly polar solvent under substantially anhydrous conditions.

Now, the present invention will be described in detail.

Figure 2:
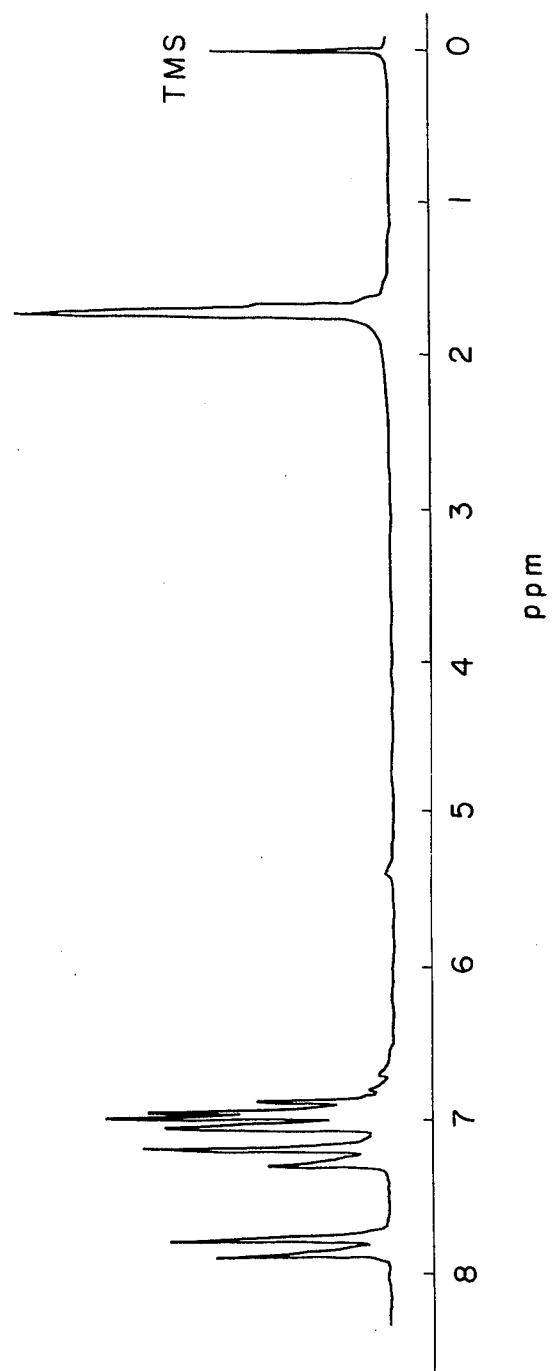

In the accompanying drawings, FIGS. 1 and 2 show the proton NMR spectra of the epoxy resin and the intermediate product (comparative sample), respectively, prepared in Example 1 given hereinafter. In the Figures, TMS represents tetramethylsilane used as a standard substance.

The epoxy resins obtained by the present invention have excellent heat resistance, chemical resistance, mechanical properties, electrical properties or water absorbing properties. The reaction product A of the compound of the general formula II with the compound of the general formula III, i.e. a precursor to be used for the production of the epoxy resin of the present invention, may be produced, for instance, by the method disclosed in Japanese Examined Patent Publication No. 7799/1967. Namely, it is obtainable by reacting a compound represented by the general formula II

where $Ar^1$ is a residual group of a dihydric phenol derived from a compound having one or two benzene nuclei and M is an alkali metal, with a compound represented by the general formula III

where $Ar^2$ is a residual group of a benzonoid compound having two halogen atoms on its nuclei and is represented by the formula $-Ar^3-Y-Ar^4-$ where each of $Ar^3$ and $Ar^4$ is a hydrocarbon group having a divalent benzene nucleus and Y is a sulfone group or a carbonyl group, and X is a fluorine atom, a chlorine atom or a bromine atom, in a highly polar solvent such as dimethylsulfoxide dimethylsulfone or sulfolane or in a solvent containing such a highly polar solvent, under substantially anhydrous conditions.

The reaction temperature is usually within a range of from 100° to 300° C. The molar ratio of the compound of the general formula II to the compound of the general formula III is usually at least 1, preferably within a range of from 1.01 to 2. By adjusting this molar ratio, it is possible to control the molecular weight of the reaction product A of the compound of the formula II with the compound of the formula III. Accordingly, it is thereby possible to control the epoxy value of the finally obtained epoxy resin.

$Ar^1$ in the compound of the formula II is the residual group of a dihydric phenol with its two aromatic hydroxyl groups being left out. Namely, $Ar^1$ is, for instance, a mono-nucleus phenylene group derived from hydroquinone or resorcin. Further, $Ar^1$ may be a residual group of a phenol compound having two nuclei. Such residual groups may have a substituent such as a halogen atom or an alkyl group on their nuclei.

The dihydric phenol may preferably be a binuclear dihydric phenol such as biphenol where two aromatic nuclei are directly linked to each other, a dihydroxydiphenylalkane or a binuclear dihydric phenol where two phenols are linked via ether-linkage oxygen (—O—), carbonyl (—CO), sulfone (—SO$_2$—) or sulfide (—S—). Specifically, there may be mentioned 2,2-bis(4-hydroxy phenyl)propane, bis(4-hydroxy phenyl)methane, 1,2-bis(4-hydroxy phenyl)ethane, 3,3-bis(4- hydroxy phenyl)pentane, 4,4′-dihydroxy diphenyl ester, 4,4′-dihydroxy diphenyl sulfone, 3-chloro-4,4′-dihydroxy diphenyl sulfone, 4,4′-dihydroxy diphenyl ketone, 4,4′-dihydroxy diphenyl sulfide or 2,2′-bis(3,5-bromo-4-hydroxy phenyl)propane.

The compounds represented by the formula II can be prepared by reacting the dihydric phenol with a compound such as an alkali metal, an alkali metal hydride, an alkali metal hydroxide, an alkali metal carbonate, an alkali metal alkoxide or an alkali metal alkyl compound. Preferably, an alkali metal hydroxide is used and it can be reacted with the dihydric phenol advantageously in the reactor which is used for polymerization. For the purpose of the present invention, two or more different dihydric phenols may be used in combination as a mixture.

The compound of the general formula III is a benzenoid compound having on each benzene nucleus one halogen atom and at least one electron attracting group such as a sulfone group or a carbonyl group at the ortho- or the para-position to the halogen atom.

The residual group $Ar^2$ in the compound of the formula III is a benzenoid residual group with the halogen atoms on the benzene nuclei being removed and is represented by the formula $-Ar^3-Y-Ar^4-$ where each of $Ar^3$ and $Ar^4$ is a hydrocarbon group having a divalent benzene nucleus and Y is a sulfone group or a carbonyl group.

This halogen-substituted benzenoid compound may have a symetric structure or asymetric structure.

More specifically, there may be mentioned 4,4′-dichlorodiphenyl sulfone, 4,4′-difluorodiphenyl sulfone, 4,4′-dichlorodiphenyl ketone or 4,4′-difluorodiphenyl ketone.

The reaction of the reaction product A with epichlohydrine can be conducted, for instance, in the solvent containing a highly polar solvent, which has been used in the preparation of the reaction product A, or in the solvent diluted with other solvent after removing the alkali metal salt formed during the reaction of the compound of the formula II with the compound of the formula III or without conducting such a treatment for removal of the alkali metal salt. This is the most simple and advantageous method. However, it is also possible to isolate the reaction product A and the isolated reaction product A is then dissolved or suspended in a proper solvent and then reacted with epichlorohydrin.

As the highly polar solvent, there may be mentioned, for instance, dimethylsulfoxide, dimethylsulfone, diethylsulfoxide or sulfolane. As other solvent, there may be mentioned, for instance, an aromatic hydrocarbon such as benzene, toluene or xylene; a halogenated hydrocarbon such as chloroform, dichloromethane or chlorobenzene; a ketone such as acetone, methyl ethyl ketone or methyl isobutyl ketone; or an ether such as tetrahydrofuran or 1,4-dioxane. Further, in the process of the present invention, the epichlorohydrin itself can be used as a part of the solvent or it is possible to use the epichlorohydrin as the sole solvent.

The reaction of the reaction product A with epichlorohydrin is usually conducted at a temperature of from room temperature to 150° C. for about 1 to 5 hours. The amount of the epichlorohydrin relative to the reaction product A may be at least one mol of epichlorohydrin per each phenolate terminal of the reaction product A. Preferably, however, the amount is within the range of from 1.5 to 20 mol per each phenolate terminal of the reaction product A.

The main reaction product formed by the reaction of the reaction product A with epichlorohydrin can be recovered, for instance, by introducing the reaction solution to an alcohol such as methanol or ethanol thereby to precipitate the reaction product and filtering and drying the precipitate. Otherwise, the reaction product may be recovered in a form of a solution by removing the alkali metal salt formed during the reaction by means of filtration and then removing the unreacted epichlorohydrin by distillation. Further, the reaction product can be obtained in a solid form by removing the alkali metal salt by filtration and then removing the unreacted epichlorohydrin and the solvent by distillation.

From the structural analysis by NMR and the measurement of the number average molecular weight by the vapor pressure osmometry, it has been found that the resin thereby obtained is substantially composed of a compound having a skeletal structure of a condensation product of the alkali metal salt of the dihydric phenol represented by the above formula II with the halogen-substituted benzenoid compound represented by the above formula III and having a glycidyl group attached to each terminal thereof.

The epoxy resin obtained by the process of the present invention can be hardened by a conventional hardner such as diethylene triamine, phthalic acid anhydride or methylnadic acid anhydride. The hardened product thereby obtained exhibits excellent heat resistance, chemical resistance, mechanical properties and water absorbability and thus is suitable for use in various fields such as for coating or paint material, laminated products, molding products or adhesives.

Now, the present invention will be described in further detail with reference to the Examples.

In the Examples, the epoxy value represents an equivalent of the epoxy groups in 100 g of the resin and was obtained by dissolving 1 g of the resin in chlorobenzene or methylene chloride and titrating it with 0.1 NBr (in acetic acid) with use of crystal violet as the indicator.

The reduced viscosity was measured at the temperature of 25° C. in chloroform with the resin concentration of 0.20 g/dl. The number average molecular weight of the epoxy resin was obtained by a vapor pressure osmometry (VPO method) using methylene chloride as the solvent and heptadecamer polystyrene as the standard sample for calibration at a temperature of 30° C.

EXAMPLE 1

Into a 1 liter flask equipped with a nitrogen gas supply tube and a continuous water collector provided with a stirrer, a thermometer and a condenser, 42.01 g (184 mmol) of 2,2-bis(4-hydroxyphenyl)propane, 100 ml of dimethylsulfoxide and 300 ml of chlorobenzene were fed and the flask was flushed with nitrogen. Then, the solution of the mixture was heated and 20 ml of an aqueous sodium hydroxide solution (368 mmol as sodium hydroxide) was dropwise added from a dropping funnel at a temperature of 60° C. While heating the solution, the water in the solution was azeotropically distilled off together with chlorobenzene and the recovered chlorobenzene was returned to the reaction system. The refluxing was continued until the water in the reaction system was almost completely removed. Then, the temperature was raised to 160° C. and 90 ml of a chlorobenzene solution containing 42.28 g (147.2 mmol) of 4,4′-dichlorodiphenyl sulfone was added. The reaction was conducted at 160° C. for 1 hour and 30 minutes and the reaction mixture was cooled. Then, 35.2 g (380 mmol) of epichlorohydrin was added and reaction was continued at a temperature of from 75° to 80° C. for 1 hour. The solution containing the main product was then cooled and diluted with 300 ml of chlorobenzene. The salt formed as by-product during the reaction was removed by filtration. The filtrate was poured into a large amount of ethanol, whereby the epoxy resin as the major product precipitated. The precipitated epoxy resin was separated by filtration and then subjected to vacuum drying. The resin thereby obtained was again dissolved in chlorobenzene, precipitated in ethanol, filtered and dried. The yield was 70.2 g. This resin had an epoxy value of 0.086 and a melting point of from 140° to 150° C.

Further, this resin was dissolved in chloroform (CDCl₃) and the protone NMR was measured, whereby the spectrum as shown in FIG. 1 was obtained and thus it was confirmed that this resin has a skeltal structure of the condensation product of 2,2-bis(4-hydroxyphenyl)-propane with 4,4'-dichlorodiphenyl sulfone and has a glycidyl group at both its terminals. (A characteristic spectrum attributable to a glycidyl group was observed at a chemical shift of from 2.6 to 4.4 ppm.) Thus, it is believed that the sodium salt of 2,2-bis(4-hydroxyphenyl)propane and 4,4'-dichlorodiphenyl sulfone were reacted to form a condensation product with both its terminals being in a form of a sodium salt and then epichlorohydrin was reacted to these both ends to form the resin.

FIG. 2 illustrates (as a Reference Example) a NMR spectrum of a polymer with its both terminals substituted by hydroxyl groups, which was obtained by reacting 2,2-bis(4-hydroxyphenyl)propane with 4,4'-dichlorodiphenyl sulfone, followed by treatment with oxalic acid for recovery.

The number average molecular weight of this resin as measured by a VPO method was 2,200, whereas the number average molecular weight culculated from the proton integrated intensity ratio of the above NMR spectrum was 2,050. These values substantially correspond to the molecular weight of 2,090 of the structure

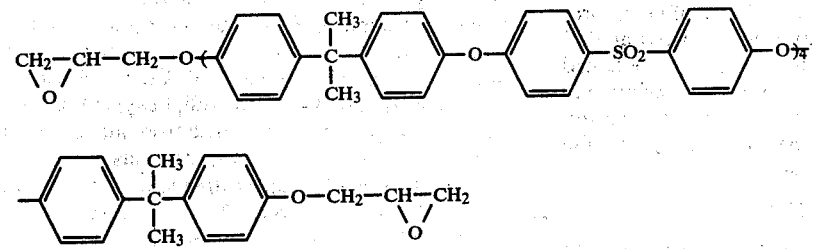

which is deduced from the molar ratio of the feed materials.

EXAMPLE 2

An epoxy resin was prepared in the same manner as in Example 1 except that the amount of 4,4'-dichlorodiphenyl sulfone was 47.56 g (165.6 mol) and the amount of epichlorohydrin was 17.6 g (190 mmol). The yield of the resin thus obtained was 74.8 g. The resin had an epoxy value of 0.040, a melting point of from 180° to 190° C. and a reduced viscosity of 0.17.

EXAMPLE 3

Into the same flask as used in Example 1, 34.79 g (139 mmol) of 4,4'-hydroxydiphenyl sulfone, 100 ml of dimethylsulfoxide and 200 ml of chlorobenzene were fed and heated to 60° C., and 25 ml of an aqueous potassium hydroxide (278 mmol as potassium hydroxide) was dropwise added thereto. The mixture solution was heated and the water in the system was distilled off in the same manner as in Example 1. The temperature was raised to 170° C. and 90 ml of a chlorobenzene solution containing 31.94 g (111.2 mmol) of 4,4'-dichlorodiphenyl sulfone was added. The mixture was reacted at 170° C. for 6 hours and then cooled to 50° C., and 25.74 g of epichlorohydrin was added. The temperature was raised to 100° C. and reaction was continued for 2 hours. After the reaction, the reaction mixture was diluted with 100 ml of dimethylsulfoxide and the formed epoxy resin was recovered in the same manner as in Example 1.

The resin thereby obtained had an epoxy value of 0.082 and a melting point of from 180° to 190° C. The number average molecular weight of this resin as measured by a VPO method was 2150, whereas the number average molecular weight calculated from the proton integral intensity ratio of the NMR spectrum was 2060. These values substantially correspond to the molecular weight of 2200 of the structure

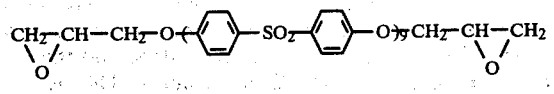

which is deduced from the molar ratios of the feed materials.

EXAMPLE 4

To the same flask as used in Example 1, 56.97 g (261 mmol) of 4,4'-dihydroxydiphenyl sulfide, 150 ml dimethylsulfoxide and 200 ml of chlorobenzene were fed and heated to 60° C., and 40 ml of an aqueous potassium hydroxide (522 mmol as potassium hydroxide) was dropwise added. The solution of the mixture was heated and the water in the system was distilled off in the same manner as in Example 1. The temperature was raised to 160° C. and 120 ml of a chlorobenzene solution containing 50 g (174 mmol) of 4,4'-dichlorodiphenyl sulfone was added. The mixture was reacted at a temperature of 160° C. for 6 hours and then cooled to 60° C., and 82.6 g of epichlorohydrin was added. The temperature was raised to 100° C. and a reaction was continued for 2 hours. The reaction mixture was cooled to room temperature and the salt formed as a by-product during the reaction was removed by filtration. The filtrate was poured into a large amount of ethanol, whereby the epoxy resin precipitated. The precipitated resin was filtered and subjected to vacuum drying. The resin thus obtained was again dissolved in methylene chloride, precipitated in ethanol, filtered and dried. The yield was 88.7 g. This resin had an epoxy value of 0.156 and a melting point of from 92° to 96° C.

EXAMPLE 5

The reaction was conducted at 160° C. for 2 hours in the same manner as in Example 4 except that 78.09 g (390 mmol) of 4,4'-dihydroxydiphenylmethane was used as the dihydric phenol, 57.17 g (262 mmol) of 4,4'-difluorodiphenylketone was used as the halogen-substituted benzenoid compound and potassium hydroxide was used in an amount of 2 mols per mol of the dihydric phenol. Then, 121 g of epichlorohydrin was added and the mixture was reacted at 100° C. for 2 hours. The reaction mixture thereby obtained was subjected to the after-treatment in the same manner as in Example 4 whereby an epoxy resin was recovered. The yield of this epoxy resin was 115.5 g and the resin had an epoxy value of 0.182.

EXAMPLE 6

A reaction was conducted at 160° C. for 6 hours in the same manner as in Example 4 except that 55.0 g (272 mmol) of 4,4'-dihydroxydiphenylether was used as the dihydric phenol, 39.49 g (181 mmol) of 4,4'-difluorodiphenylketone was used as the halogen-substituted benzenoid compound and potassium hydroxide was used in an amount of 2 mols per mol of the dihydric phenol. Then, 85 g of epichlorohydrin was added and the mixture was reacted at 100° C. for 2 hours. The reaction mixture was subjected to the after-treatment in the same manner as in Example 4, whereby an epoxy resin was recovered. The yield of this epoxy resin was 76.0 g and the resin had an epoxy value of 0.185.

EXAMPLE 7

A reaction was conducted at 160° C. for 6 hours in the same manner as in Example 4 except the 60.45 g (344 mmol) of biphenol was used as the dihydric phenol, 65.9 g (230 mmol) of 4,4'-dichlorodiphenyl sulfone was used as the halogen-substituted benzenoid compound, potassium hydroxide was used in an amount of 2 mols per mol of the dihydric phenol and dimethyl sulfoxide was used in an amount of 200 ml. Then, 118 g of epichlorohydrin was added and the mixture was reacted at 100° C. for 2 hours. The reaction mixture thereby obtained was subjected to the after-treatment in the same manner as in Example 4, whereby an epoxy resin was recovered. The yield of the epoxy resin was 91.6 g and the resin had an epoxy value of 0.130.

EXAMPLE 8

A glass fiber-reinforced laminated sheet was prepared by using an epoxy resin prepared in the same manner as in Example 1 and having an epoxy value of 0.152. Namely, 100 parts by weight of the epoxy resin, 8.9 parts by weight of diaminodiphenyl sulfone and 1 part by weight of a trifluoroboron monoethylamine complex were dissolved in 100 parts by weight of methylethyl ketone to obtain a varnish.

Then, the above varnish was impregnated to a glass cloth having a thickness of 0.18 mm, then dried and subjected to a B-stage treatment, whereby a prepreg having a resin content of 40% was obtained. Eight sheets of this prepreg were superimposed one on another and subjected to heat-press treatment with press pressure of 70 kg/cm$^2$ at a temperature of 200° C. for 2 hours, whereby an epoxy resin laminated sheet was obtained.

Test pieces were cut out from the laminated sheet and various physical properties were measured. This laminated sheet had a thermal decomposition initiating temperature (the temperature at which a weight reduction of 1% by weight takes place) of 380° C. and bending strength of 54.6 kg/mm$^2$ and 33.0 kg/mm$^2$ at 23° C. and 150° C., respectively. Accordingly, the rate of bending strength at 150° C. relative to the bending strength at 23° C. was 60.4%.

EXAMPLE 9

A glass fiber-reinforced laminated sheet was prepared by using an epoxy resin prepared in the same manner as in Example 3 and having an epoxy value of 0.138. Namely, 100 parts by weight of the epoxy resin, 8.6 parts by weight of diaminodiphenyl sulfone and 1.0 part by weight of a trifluoroboron monoethylamine complex were dissolved in 100 parts by weight of dimethylformamide to obtain a varnish.

Then, a prepreg of glass cloth was prepared in the same manner as in Example 8 by using the above varnish. Eight sheets of this prepreg were superimposed one on another and subjected to heat-press treatment with a press pressure of 70 kg per cm$^2$ at a temperature of 240° C. for 2 hours, whereby an epoxy resin laminated sheet was obtained.

The physical properties of the laminated sheet were measured and it was found that the laminated sheet had a thermal decomposition initiation temperature (the temperature at which a weight reduction of 1% by weight takes place) of 300° C. and bending strength of 50.4 kg/mm$^2$ and 40.3 kg/mm$^2$ at 23° C. and 150° C., respectively. Accordingly, the bending strength holding rate at 150° C. relative to the bending strength at 23° C. was 80.0%. Further, this laminated sheet had a dielectric constant ($\epsilon$) of 3.88 and a dielectric loss tangent (tan $\delta$) of 0.004 at 1 KHz at room temperature.

EXAMPLE 10

A non-solvent type resin composition was prepared by mixing 50 parts by weight of the epoxy resin prepared in Example 3, 50 parts by weight of Epikote #828 (trade name for a diglicidyl ether of bisphenol A, manufactured by Shell International Chemical Co.), 20.6 parts by weight of 4,4'-diaminodiphenyl sulfone and 1.0 part by weight of a trifluoroboron monoethylamine complex. The resin composition thus obtained was poured into a mold under heating and heat-treated in an oven at 100° C. for 2 hours. Then, the temperature was raised to 175° C. and the heat treatment was continued for 6 hours at that temperature, whereupon a hardened resin sheet having a thickness of 3 mm was obtained. Test pieces were cut out from this molded sheet and various properties were measured. The bending strength was 13.2 kg/mm$^2$ and 7.2 kg/mm$^2$ at 23° C. and 180° C., respectively. Accordingly, the bending strength holding rate at 180° C. relative to the bending strength at 23° C. was 54.5%. The Izod impact strength was 6.8 kg·cm/cm$^2$. As a test for resistance against an organic solvent, the test piece was immersed in methyl ethyl ketone at 25° C. for 7 days, whereupon the weight increase was 0.25% by weight.

COMPARATIVE EXAMPLE 1

A laminated sheet was prepared by using commercially available Epikote #828 as an epoxy resin. Namely, 100 parts by weight of the epoxy resin, 32.7 parts by weight of diaminophenyl sulfone and 1.5 parts by weight of a trifluoroboron monoethylamine complex were dissolved in 100 parts by weight of methylethyl ketone to obtain are varnish. With use of the varnish, a prepreg was prepared in the same manner as in Example 8. Eight sheets of this prepreg were superimposed one on another and subjected to heat press treatment with press pressure of 70 kg/cm² at the temperature of 200° C. for 2 hours, whereby a laminated sheet was obtained.

The physical properties of this laminated sheet were measured and it was found that this laminated sheet had thermal decomposition initiation temperature of 240° C. and bending strength of 55.6 kg/mm² at 23° C. and 33.9 kg/mm at 150° C. Accordingly, the bending strength holding rate at 150° C. relative to the bending strength at 23° C. was 61.0%. The laminated sheet had a dielectric constant ($\epsilon$) of 4.69 and a dielectric loss tangent (tan $\delta$) of 0.007 at 1 KHz at room temperature.

Thus, the laminated sheets of Examples 8 and 9 are superior to the laminated sheet of Comparative Example 1 in the thermal decomposition initiation temperature. Further, the laminated sheet of Example 9 is superior to the laminated sheet of Comparative Example 1 in the dielectric constant ($\epsilon$) and the dielectric loss tangent (tan $\delta$).

COMPARATIVE EXAMPLE 2

A hardened resin sheet was prepared in the same manner as in Example 10 except that 100 parts by weight of only Epikote #828 was used as an epoxy resin and 32.7 parts by weight of 4,4'-diaminodiphenyl sulfone and 1.0 parts of a trifluoroboron monoethylamine complex were mixed thereto. The bending strength of this resin sheet was 13.4 kg/mm² and 4.9 kg/mm² at 23° C. and 180° C., respectively. Accordingly, the bending strength holding rate at 180° C. relative to the bending strength at 23° C. was 36.6%. The Izod impact strength was 4.8 kg·cm/cm². The resistance against an organic solvent was tested in the same manner as in Example 10 and the weight increase was 0.37% by weight.

Thus, the resin sheet of Example 10 is superior to the resin sheet of Comparative Example 2 in each of the bending strength at 180° C., the bending strength holding rate and the Izod impact strength. Further, the resin sheet of Example 10 is superior to the resin sheet of Comparative Example 2 also in the organic solvent resistance.

In the above Examples, the physical properties were measured in accordance with the following methods: thermogravimetric analysis for the thermodecomposition initiation temperature, JIS K-6911 for the bending strength, JIS K-6760 for the Izod impact strength and JIS K-6911 for the dielectric constant and the dielectric loss tangent.

We claim:

1. An epoxy resin substantially represented by the general formula

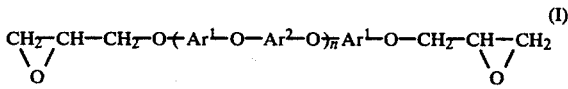

where $Ar^1$ is a residual group of a dihydric phenol derived from a compound having one or two benzene nuclei, $Ar^2$ is residual group of a halogen-substituted benzenoid compound having two halogen atoms on its nuclei and represented by the formula $-Ar^3-Y-Ar^4-$ where each of $Ar^3$ and $Ar^4$ is a hydrocarbon group having a divalent benzene nucleus and Y is a sulfone group or a carbonyl group, and n is an integer of from 1 to 50.

2. The epoxy resin according to claim 1 wherein $Ar^1$ in the general formula I is a residual group of a dihydric phenol selected from the group consisting of 2,2-bis(4-hydroxyphenyl)propane, bis(4-hydroxyphenyl)methane, 1,2-bis(4-hydroxyphenyl)ethane, 4,4'-dihydroxydiphenyl ether, 4,4'-dihydroxydiphenylsulfide, 4,4'-dihydroxydiphenylsulfone, 4,4'-dihydroxydiphenylketone and biphenol.

3. The epoxy resin according to claim 1 wherein $Ar^2$ in the general formula I is a residual group of a halogen-substituted benzenoid compound selected from the group consisting of 4,4'-dichlorodiphenylsulfone, 4,4'-difluorodiphenylsulfone, 4,4'-dichlorodiphenylketone and 4,4'-difluorodiphenylketone.

4. The epoxy resin according to claim 2 wherein $Ar^2$ in the general formula I is a residual group of a halogen-substituted benzenoid compound selected from the group consisting of 4,4'-dichlorodiphenylsulfone, 4,4'-difluorodiphenylsulfone, 4,4'-dichlorodiphenylketone and 4,4'-difluorodiphenylketone.

5. A process for producing an epoxy resin which comprises reacting epichlorohydrin with a reaction product A obtained by reacting a compound represented by the general formula II

where $Ar^1$ is a residual group of a dihydric phenol derived from a compound having one or two benzene nuclei and M is an alkali metal, with a compound represented by the general formula III

where $Ar^2$ is a residual group of a halogen-substituted benzenoid compound having two halogen atoms on its nuclei and represented by the formula $-Ar^3-Y-Ar^4-$ where each of $Ar^3$ and $Ar^4$ is a hydrocarbon group having a divalent benzene nucleus and Y is a sulfone group or a carbonyl group, and X is a fluorine atom, a chlorine atom or a bromine atom, in a solvent containing a highly polar solvent under substantially anhydrous conditions.

6. The process according to claim 5 wherein the compound of the general formula II is reacted with the compound of the general formula III in a molar ratio of the Compound II to the Compound III being from 1.01 to 2.0.

7. The process according to claim 5 wherein the epichlorohydrin is reacted with the reaction product A in a ratio of at least 1 mol of the epichlorohydrin per one phenolate terminal of the reaction product A.

8. The process according to claim 6 wherein the epichlorohydrin is reacted with the reaction product A in a ratio of at least 1 mol of the epichlorohydrin per one phenolate terminal of the reaction product A.

* * * * *